United States Patent
Wolfson et al.

(10) Patent No.: US 11,853,169 B2
(45) Date of Patent: *Dec. 26, 2023

(54) BACKUP AND TIERED POLICY COORDINATION IN TIME SERIES DATABASES

(71) Applicant: EMC IP Holding Company LLC, Hopkinton, MA (US)

(72) Inventors: Kfir Wolfson, Beer Sheva (IL); Assaf Natanzon, Tel Aviv (IL); Jehuda Shemer, Kfar Saba (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/051,942

(22) Filed: Nov. 2, 2022

(65) Prior Publication Data

US 2023/0072644 A1 Mar. 9, 2023

Related U.S. Application Data

(63) Continuation of application No. 17/184,976, filed on Feb. 25, 2021, now Pat. No. 11,513,908, which is a continuation of application No. 16/035,221, filed on Jul. 13, 2018, now Pat. No. 10,936,434.

(51) Int. Cl.
*G06F 11/14* (2006.01)
*G06F 16/21* (2019.01)

(52) U.S. Cl.
CPC ...... *G06F 11/1461* (2013.01); *G06F 11/1451* (2013.01); *G06F 11/1464* (2013.01); *G06F 16/219* (2019.01); *G06F 2201/80* (2013.01)

(58) Field of Classification Search
CPC ............ G06F 11/1461; G06F 11/1451; G06F 11/1464; G06F 16/219; G06F 2201/80
See application file for complete search history.

(56) References Cited

U.S. PATENT DOCUMENTS

| | | | |
|---|---|---|---|
| 6,785,786 B1 | 8/2004 | Gold et al. | |
| 7,047,386 B1 * | 5/2006 | Ngai | G06F 9/5016 |
| | | | 711/170 |
| 8,060,476 B1 | 11/2011 | Afonso et al. | |
| 8,819,762 B2 | 8/2014 | Harrison | |
| 9,753,935 B1 * | 9/2017 | Tobin | G06F 16/24568 |
| 10,324,893 B1 * | 6/2019 | Telang | G06F 11/14 |
| 10,810,088 B1 * | 10/2020 | Gu | G06F 11/1464 |
| 2004/0236800 A1 * | 11/2004 | Elkady | H04L 41/00 |
| 2008/0307175 A1 * | 12/2008 | Hart | G06F 11/1458 |
| | | | 711/E12.103 |
| 2012/0110289 A1 * | 5/2012 | Murase | G06F 11/1458 |
| | | | 711/E12.103 |
| 2012/0215743 A1 | 8/2012 | Triantafillos et al. | |
| 2014/0059311 A1 | 2/2014 | Oberhofer et al. | |
| 2016/0026536 A1 | 1/2016 | Poluri | |

(Continued)

*Primary Examiner* — Cam Y T Truong
(74) *Attorney, Agent, or Firm* — Workman Nydegger

(57) ABSTRACT

A data protection system configured to backup a time series database is provided. The data protection system may be integrated with or have access to consolidation policies of the time series database. The backup policy and backup retention policy are set by monitoring the consolidation policy and adjusting the backup policy to ensure that the data in the time series database is protected prior to being downscaled, discarded or otherwise consolidated.

20 Claims, 2 Drawing Sheets

(56) References Cited

U.S. PATENT DOCUMENTS

| | | |
|---|---|---|
| 2016/0357828 A1 | 12/2016 | Tobin et al. |
| 2017/0060699 A1* | 3/2017 | Hohl .................. G06F 11/1469 |
| 2018/0189146 A1* | 7/2018 | Banasik ............. G06F 11/1458 |
| 2021/0271758 A1* | 9/2021 | Bedhapudi .......... G06F 16/1752 |

* cited by examiner

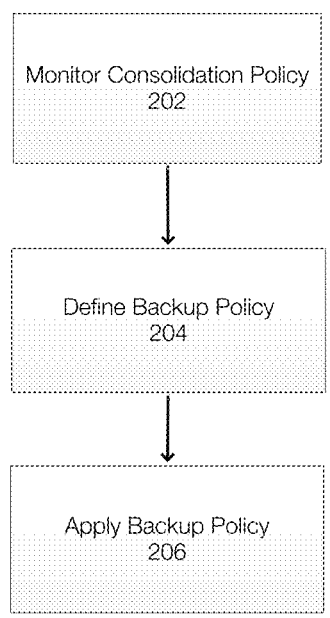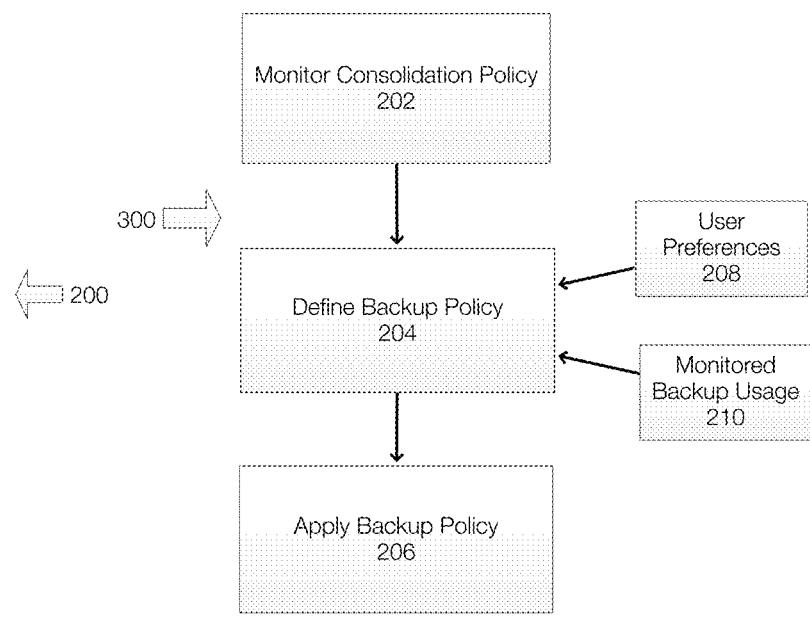
Figure 2
Figure 3

BACKUP AND TIERED POLICY COORDINATION IN TIME SERIES DATABASES

FIELD OF THE INVENTION

Embodiments of the invention relate to policies of system and methods for backing up data. Embodiments of the present invention relate to systems and methods for maintaining high resolution data it time series databases.

BACKGROUND

IOT (Internet of Things) devices are proliferating and becoming more commonplace in everyday life. Devices that are connected to the Internet include anything from cars and appliances to speakers and sensors. With the proliferation of IOT devices, data is being streamed at an ever growing rate.

Generally, the data generated by IOT devices is transmitted to a central backend (e.g., a datacenter or the cloud) and most of the processing occurs at the backend. After initially processing the data, the data is often stored in a time series database. The time series database can be used at least for analytics and for machine learning purposes. Examples of time series databases include InfluxDB, Dalmantiner DB and OpenTSDB.

Time series databases are useful because there is often a need for historical data. However, it is not typically feasible to keep older data. In conventional systems, older data is typically discarded or downscaled. Discarded data is no longer available and downscaled data lacks high resolution. Data is discarded or downscaled because the size of the database is not unlimited and, as a practical matter, something must be done given the limits of database in order to make room for new data. The lack of space could be attributed to cost rather than lack of storage space.

Existing backup solutions do not sufficiently protect time-series databases and do not ensure that data is not lost. More specifically, existing backup solutions fail because they are configured to back up the databases. However, the data in the databases often includes downscaled data. Thus, the data being backed as lost some of its usefulness and resolution. In addition, some of the data may have been discarded before the backup was performed. In addition, time series databases usually reside on tier 1 storage, which is relatively expensive. As a result, data retention is limited due to the cost.

Systems and methods are needed for protecting the data stored in time series databases.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which:

FIG. 2 is a flow diagram illustrating an example of a method for backing up a time series database; and FIG. 3 is a flow diagram illustrating an example of a method for backing up a time series database and setting a retention policy for the backups.

DETAILED DESCRIPTION OF SOME EXAMPLE EMBODIMENTS

Figure 1:
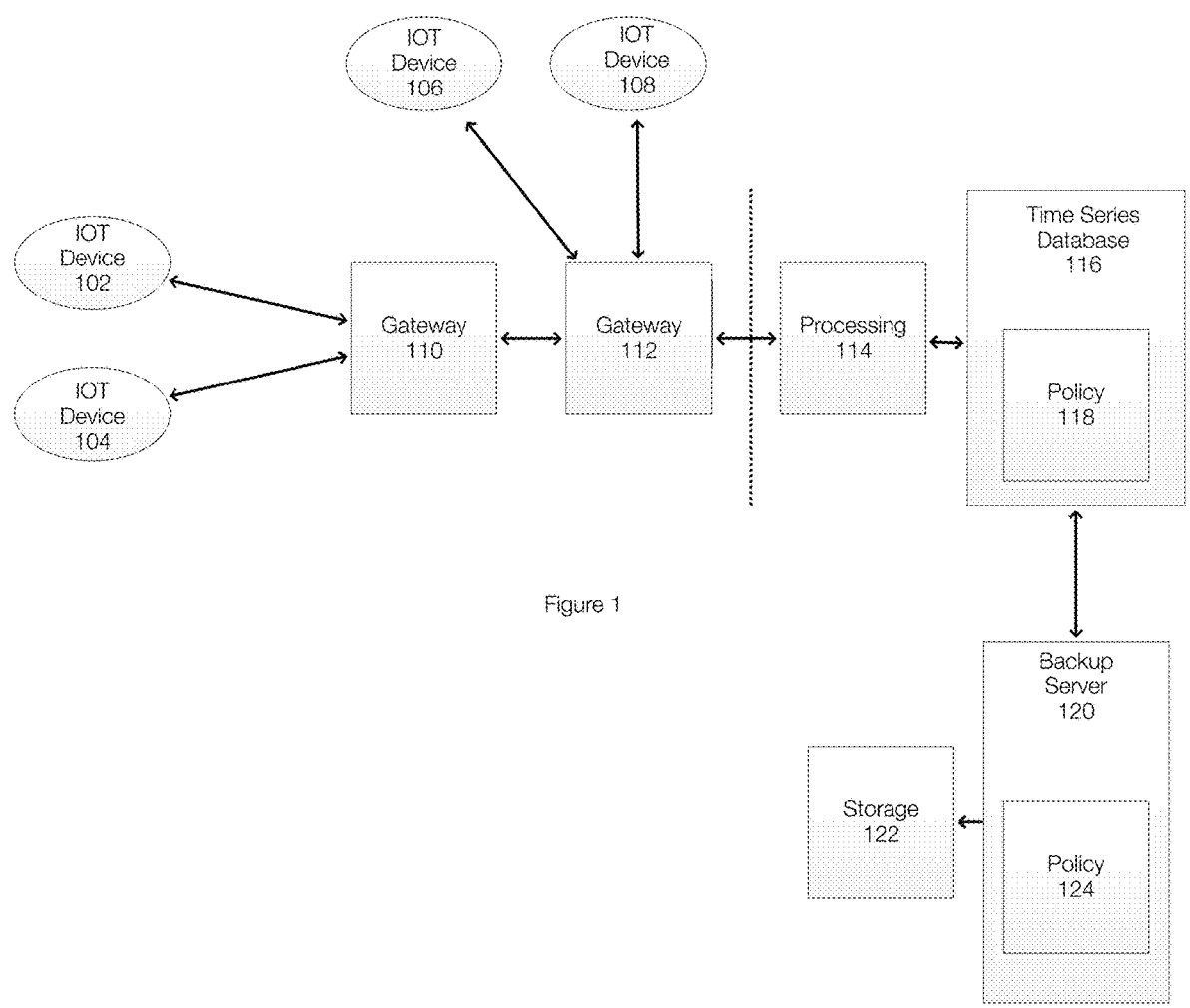
FIG. 1 is a block diagram illustrating a data protection system configured to backup a time series database in a dynamic and policy based manner.

Embodiments of the invention relate to systems and methods for protecting data generated by IOT devices and in particular to data stored in time series databases. Embodiments of the invention further relate to backup and tiered policy coordination for maintaining high resolution in time series databases.

With the proliferation of IOT devices, ongoing data streams to an on-premise data center or to the cloud are being added in an ever growing rate. The amount of data is increasing and the storage requirements are increasing as well. The data streams generated by IOT devices are typically appended to a time series database. Time series databases, as previously stated, only save the most recent data in its highest resolution. Older data is consolidated, trimmed (deleted or discarded) or downscaled using various resolution operators. Resolution operators include down-sampling, the number of bits per sample may be reduced, increasing image compression ratios, and the like or combination thereof. This limits the quality of forensics that can be done in IOT systems. This may also have an impact when an issue occurs. For example, retraining machine learning algorithms is difficult and not as successful when using consolidated data or when the data is not available.

Embodiments of the invention coordinate between two independent systems and, in one example, integrate a data protection system with a time series database. Embodiments of the invention coordinate IOT data stream management and backend data protection system. This achieves retention of older data in full resolution and may employ lower cost storage.

As used herein and by way of example, an IOT device is a device that can produce information/data or receive commands in order to control an environment. A driverless car, for example, may generate data and may receive commands. An IOT thermostat may generate temperature data and may receive commands to adjust the temperature of an environment. Other IOT device may be more complex in operation and may interact with other IOT devices. IOT devices may be located as an end point or may be positioned between the two IOT devices or between an IOT device and a gateway.

A gateway may be a device configured to consolidate the communication and management of multiple IOT devices. The gateway may connect the IOT devices with the Internet, for example. For some IOT devices, networking capabilities are local and a gateway enables access to the Internet. The gateway may simply be an access point. Alternatively, the gateway may perform some processing on the data being transmitted.

As previously stated, a time series DB (TSDB) may hold several days (or other time period) of raw data at the highest resolution. At some point, however, the older or oldest data is discarded or downscaled. However, older data may be useful. For example, older data can be used in forensics, after an event of high significance is discovered to have happened or initiated in the past. Such an event can be equipment malfunction, a code issue, a medical event, a weather extreme condition, etc. depending on the IOT application. Older data can also be used to retrain machine learning applications, after discovering in hindsight that a certain event was not as it was originally perceived. Thus, there is a need for high resolution data that is older in time.

As previously stated, conventional backup application do not ensure that there is no loss of data because they do not appreciate the workings of a time series database. Data lakes are not sufficient at least because even in a data lake, the data is ultimately removed.

Embodiments of the invention employ data protection methods and systems to time series database in order to achieve cost-effective data retention. Embodiments of the invention allow access to older information when necessary.

FIG. 1 illustrates an example of a system for maintaining high resolution in time series databases. FIG. 1 illustrates an example of IOT devices that are connected over a network connection and are connected to the Internet. FIG. 1 illustrates how IOT data is streamed into a time series database. In one example, the IOT devices 102, 104, 106 and 108 are edge devices. These devices are typically the IOT devices that generate data. A sensor, for example, generates sensor data (a thermometer generates temperature data). Other sensors may be configured to detect environmental conditions and may be dependent on the environment being monitored. A radioactive sensor, for example, may be used in an environment that uses radioactive material while a wind speed sensor may be used in an outdoor environment.

Other IOT devices, such as a car, may generate different data. A car may generate device operation parameters (engine temperature, speed, direction of travel, fluid levels, RPM, battery status, and the like). In each case, the data generated at each of the IOT devices 102, 104, 106 and 108 is transmitted to a time series database. One of skill in the art understands that there may be multiple time series databases and that not all IOT devices transmit data to the same time series database.

More specifically, a plurality of related IOT devices may all transmit data to the same time series database. For example, cars made by a particular manufacture may all transmit their data to one or more of the manufacturer's time series database. This may be divided by model, model year or in another manner. In another example, a factory may be associated with multiple sensors and equipment. These IOT devices may deliver their data to a time series database associated with the factory. Other arrangements are possible.

In one example, an IOT device may have wireless capabilities (or wired capabilities) and may interact with a gateway. The IOT devices 102 and 104, for example, transmit their data through the gateway 110 and the gateway 112 while the IOT devices transmit their data through the gateway 112. The gateways 110 and 112 may be wireless access points or devices that are able to communicate with the IOT devices and then forward the received data to the time series database 116. Commands from processing 114 or from another server or device can be delivered to the IOT devices.

For example, an IOT device may be a controller that controls operation of a drone or a driverless car. The data from the IOT device can be used to control the IOT device. For example, the car may send its location and may receive back information about road construction and alternate directions. A temperature controller may receive a command to change the temperature automatically.

Thus, the data from the IOT devices is processed at processing 114. Processing 114 may include formatting the data, normalizing the data, sorting the data, or the like. The data is then added to or streamed to the time series database 116.

The time series database 116 typically contains sets of data that are related, by way of example, in time. When data from the IOT devices is initially stored in the timer series database 116, the data may be stored at full resolution (or at the resolution at which the data was received). As the data ages, the data may be downscaled, which results in a loss of resolution. Embodiments of the invention prevent this from occurring and improve the operation and functionality of the computing devices and of the time series database.

The manner in which the data maintained or stored in the time series database 116 is associated with a retention policy 118. The retention policy 118 may specify, for example, when to downscale the data, when to discard data, or the like. The retention policy may make these decisions based on available storage, cost, or the like. Thus, the amount of data received by the time series database 116 may have an impact on when the older data is downscaled or discarded.

In FIG. 1, the backup server 120 is responsible for backing up the time series database 116. Backups of the data from the time series database 116 or of portions of the time series database 116 are stored in the storage 122 as save sets.

In operation, the backup server 120 may read or receive the retention policy 118 of the time series database 116. This allows the backup server to set a backup policy 124 to ensure that the data in the time series database 116 is backed up, by way of example, before the older data is downscaled. The policy 124 can be set automatically by the backup server 120 and or adjusted over time in accordance with changes to the retention policy 118.

This process ensures that a copy of the data is saved, at high resolution, before the data is discarded or downscaled. The storage 122 may be a lower or less expensive storage than the storage of the time series database 116. Thus, the operational cost is lower even though the retrieval time may be longer. However, it allows the older data to be retained for a longer period of time in a high resolution state.

Further, the policy 124 may specify multiple storage tiers. The oldest data may be sent to inexpensive storage in the cloud while relatively newer data may be saved to a local backup storage in the same data center as the time series database tier 1 storage. In some examples, downscaled data may also be backed up by the backup server 120.

The backup server 120 may include a catalog with the save sets in the storage 122. The catalog may contain information on where each data series is saved as well as the resolution of that data.

The policy 124 may also specify a retention period for the backup data and may incorporate machine learning. The backup server 120 may be configured to learn over time how much data should be retained and for how long. For example, usage of the save sets in the storage 122 may be observed over a period of time. This allows a retention policy to be derived from actual use of the save sets or backups of the time series database.

FIG. 2 is a flow diagram illustrating an example of a method for tiered policy coordination for maintaining high resolution in time series databases. The method 200 may begin by monitoring 202 a consolidation policy of a time series database. The consolidation policy may specify how and when data is consolidated. The consolidation policy may also specify when data is discarded or deleted from the time series database.

Monitoring the policy of the time series database may also include reading the policy. The policy can be read continuously, periodically, when instructed, or the like. Changes in the consolidation policy may also be tracked. The changes may be used in adjusting a policy of the backup server. For example, if the consolidation policy shortens the time that data is kept at a high resolution, then the frequency of the backup may increase. Thus, the data protection application can adapt to changes in the consolidation policy.

Thus, based at least on the monitored consolidation policy, a backup policy is defined 204. As previously stated, the backup policy may be configured to take a backup prior to a point where the data is downscaled or discarded. Because the data may be downscaled more than once before being deleted from the time series database, the backup policy may backup different versions of the data (at different resolutions).

After defining the backup policy 204, the backup policy is applied 206. This may include performing a backup of the time series database based on a schedule of when data is downscaled. The backup policy may also include movement of backed up data from one tier of storage to another tier of storage. A catalog, which defines where data is stored and/or at what resolution, is also updated in accordance with the backup policy.

In FIG. 2, the backup server may connect to a time series database, pull and understand its data consolidation policies. This information is used to automatically derive the backup policy. The data protection system is then configured to backup the time series database according to the derived backup policy. When the consolidation policy changes, the backup policy is automatically and dynamically adapted to accommodate the new consolidation policy. As a result, although data in the time scaled database is still downscaled and/or discarded, a full resolution version of the older data may be present in a backup. The retention policy of the data protection system may differ from the policies of the time series database.

More specifically, the consolidation policies monitored at 202 may contain information such as for how long raw data streams are obtained, at what intervals they are trimmed, and if or when their resolution is reduced.

With this information from the consolidation policy, the backup policy can be generated. The backup policy can improve the likelihood if not guarantee that a backup of the data will be made before the data is lost or downscaled.

FIG. 3 illustrates an example of a method for performing a data protection operation, such as a backup operation, for a time series database. FIG. 3 is similar to FIG. 2 and this description will be omitted. FIG. 3 further illustrates that a retention aspect of the backup policy (how long the backup is kept) defined at 204 may be determined from user input, user preferences 208, and/or monitored backup usage 210.

For example, the retention time of the data saved in the lower tiers of storage (the data protection systems) may be bounded by preferences the user set for the system, e.g. "4 to 8 weeks". However, the data protection system may be configured to learn, over time, how long the retention period should actually be. The data protection system may then automatically set a retention time. The automatically determined retention time may be bounded by the user preferences 208. For example, the user preferences 208 may specify that backups are kept between 4 to 8 weeks. They system may learn that the optimal backup retention time is 6 weeks. The backup policy may be updated to reflect this value. If the system determines that the optimal retention time is 3 weeks or that 8 weeks is insufficient, an administrator may be notified so that the retention time can be adjusted. The retention may alternatively be adjusted along with a notification of the change.

In one example, the data protection system may monitor how the backups are used. If backups that are 7 weeks old are accessed at some frequency (once in a certain time period may be a sufficient threshold), then the retention period may be set to 6 weeks. If no backups older than 7 weeks are accessed over a certain period of time (e.g., 6 months or a year), the system may determine that 8 weeks is a sufficient retention period. Thus, the data protection system learn over time how much is really required, and will automatically choose a retention time within the defined boundaries. The system will infer this value by using machine learning algorithms after observing the backed up data typical usage over a long enough period, e.g. of several months.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   monitoring, by a data protection system that includes one or more processors, a consolidation policy of a database, wherein the consolidation policy includes consolidation data that identifies when data in the database is downscaled or discarded;
   defining, by the one or more processors, a backup policy of the data protection system that is dependent on the consolidation policy of the database;
   generating, by the one or more processors, backups of the data in the database in accordance with the backup policy by the data protection system, wherein the backup policy ensures that the backups are generated before the data in the database is downscaled or discarded such that the backups contain full copies of the data; and
   updating, by the one or more processors, a catalog that identifies where the backups are stored.

2. The method of claim 1, wherein the consolidation policy specifies how and when data is consolidated and/or when data is reduced in resolution or deleted, further comprising deriving the backup policy from the consolidation policy.

3. The method of claim 1, further comprising detecting, by the one or more processors, a change in the consolidation policy and dynamically adjusting the backup policy whenever the consolidation policy changes in order to accommodate the detected change to the consolidation policy.

4. The method of claim 1, further comprising increasing a frequency of performing backups when a time at which the data is kept at a high resolution shortens.

5. The method of claim 1, further comprising monitoring usage of the backups and adjusting a retention period of the backups based on the monitored usage, wherein the retention period is based on user preferences and wherein the user preferences express a boundary for the retention period.

6. The method of claim 1, wherein the data is time series data, further comprising adjusting a backup frequency when a time that the time series data is kept at a high resolution changes to a lower resolution.

7. The method of claim 1, wherein the catalog identifies a resolution of the data stored in the backups, further comprising ensuring that a full resolution of the data is backed up before older data is downscaled.

8. The method of claim 1, wherein the backups further include backups of downscaled versions of the data in the database, wherein the downscaled versions have different resolutions of the data in the database.

9. The method of claim 1, further comprising deriving the backup policy from the consolidation policy, wherein the data includes time series data and wherein the consolidation policy specifies how raw data streams are obtained, at what intervals the raw data streams are trimmed, and/or when resolutions of the raw data streams are reduced.

10. The method of claim 1, wherein the backups include full resolutions of the data, further comprising archiving backups that has full resolution of the database.

11. A non-transitory storage medium having stored therein instructions that are executable by one or more hardware processors to perform operations comprising:
    monitoring, by a data protection system that includes one or more processors, a consolidation policy of a database, wherein the consolidation policy includes consolidation data that identifies when data in the database is downscaled or discarded;
    defining, by the one or more processors, a backup policy of the data protection system that is dependent on the consolidation policy of the database;
    generating, by the one or more processors, backups of the data in the database in accordance with the backup policy by the data protection system, wherein the backup policy ensures that the backups are generated before the data in the database is downscaled or discarded such that the backups contain full copies of the data; and
    updating, by the one or more processors, a catalog that identifies where the backups are stored.

12. The non-transitory storage medium of claim 11, wherein the consolidation policy specifies how and when data is consolidated and/or when data is reduced in resolution or deleted, further comprising deriving the backup policy from the consolidation policy.

13. The non-transitory storage medium of claim 11, further comprising detecting, by the one or more processors, a change in the consolidation policy and dynamically adjusting the backup policy whenever the consolidation policy changes in order to accommodate the detected change to the consolidation policy.

14. The non-transitory storage medium of claim 11, further comprising increasing a frequency of performing backups when a time at which the data is kept at a high resolution shortens.

15. The non-transitory storage medium of claim 11, further comprising monitoring usage of the backups and adjusting a retention period of the backups based on the monitored usage, wherein the retention period is based on user preferences and wherein the user preferences express a boundary for the retention period.

16. The non-transitory storage medium of claim 11, wherein the data is time series data, further comprising adjusting a backup frequency when a time that the time series data is kept at a high resolution changes to a lower resolution.

17. The non-transitory storage medium of claim 11, wherein the catalog identifies a resolution of the data stored in the backups, further comprising ensuring that a full resolution of the data is backed up before older data is downscaled.

18. The non-transitory storage medium of claim 11, wherein the backups further include backups of downscaled versions of the data in the database, wherein the downscaled versions have different resolutions of the data in the database.

19. The non-transitory storage medium of claim 11, further comprising deriving the backup policy from the consolidation policy, wherein the data includes time series data and wherein the consolidation policy specifies how raw data streams are obtained, at what intervals the raw data streams are trimmed, and/or when resolutions of the raw data streams are reduced.

20. The non-transitory storage medium of claim 11, wherein the backups include full resolutions of the data, further comprising archiving backups that has full resolution of the database.

\* \* \* \* \*